Jan. 10, 1939.  L. M. PERSONS ET AL  2,143,085
MOTOR PROTECTOR
Filed June 26, 1936
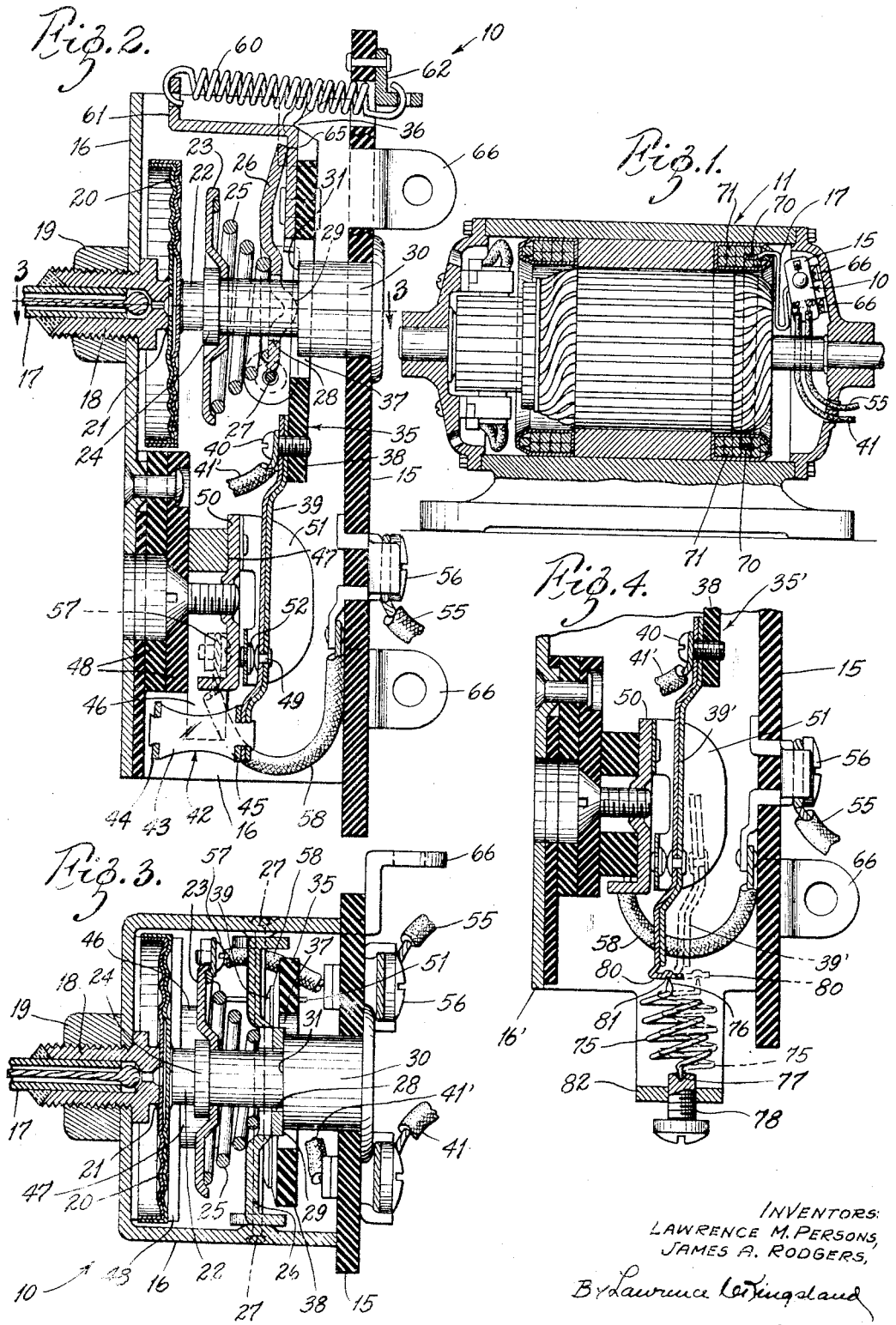
INVENTORS:
LAWRENCE M. PERSONS,
JAMES A. RODGERS,
By Lawrence C. Kingsland
ATTORNEY.

Patented Jan. 10, 1939

2,143,085

UNITED STATES PATENT OFFICE 2,143,085

MOTOR PROTECTOR

Lawrence M. Persons and James A. Rodgers, St. Louis, Mo., assignors, by mesne assignments, to Automatic Control Corporation, St. Louis, Mo., a corporation of Delaware Application June 26, 1936, Serial No. 87,350

7 Claims. (Cl. 172—36)

The present invention relates generally to motor protectors, and more particularly to motor protectors including a thermally actuated switch used in combination with a motor to break the circuit thereof upon excessive heating of the motor windings.

Heretofore, motor protectors of various kinds have been employed to prevent injury to the windings or other parts of a motor upon short circuit, a block, or a continuously applied overload, which result in the windings and other parts of the motor being subjected to temperatures beyond the critical heat point thereof.

In the present invention, a switch assemblage is installed within the casing of a motor and is adapted to be affected by heat passing through the insulation of the field windings. This is accomplished by having a tube carrying a thermally sensitive fluid disposed with a portion contiguous to the windings and having an end operatively connected with the switch. In order to obtain switch action at several predetermined temperatures of the windings, a switch blade, hereinafter to be designated secondary lever, of a bimetallic construction, is used in the switch to cooperate with the thermally sensitive fluid.

It is an object of the present invention to provide a switch assemblage used in combination with a motor which is adapted to open upon an excessive temperature in the field windings of the motor.

Another object is to provide, in combination with a motor, a switch assemblage which will open at one temperature of the motor field windings upon sudden rise in heat therein, and which will open at another relatively higher temperature of the motor field windings upon gradual rise of heat therein.

Another object is to provide, in combination with a motor, a switch assemblage having both fluid and bimetallic thermally sensitive means, whereby heat generated in the field coils of the motor will effect a breaking of the switch contacts either upon a short circuit, a block, or a continuous overload.

Other objects and advantages of the invention will be apparent from the following description thereof, taken in connection with the accompanying drawing, in which Fig. 1 is a view in central section of a motor showing, in combination therewith, a thermally sensitive switch mechanism mounted within the casing.

Fig. 2 is a central longitudinal section through one type of thermally sensitive switch which may be used in combination with a motor.

Fig. 3 is a section on the line 3—3 of Fig. 2.

Fig. 4 is a central longitudinal section, parts being broken away, of a thermally sensitive switch showing a modified form of contact snap-action.

Referring more particularly to the drawing by reference numerals, in Fig. 1 there is shown a thermally sensitive switch assemblage, generally indicated 10, mounted on and within the casing of a motor, generally indicated 11. A direct current motor is disclosed, but it is to be understood that any type of motor may be employed in the combination contemplated by the present invention.

Referring, for the moment, to Fig. 2, there is disclosed one form of thermally sensitive switch assemblage which may be employed in the combination of the present invention. A plate 15 of non-conductive material has connected thereto a U-shaped frame element 16, the plate and element including between them the working parts of the switch assemblage exclusive of a fluid-carrying tube 17. The tube 17 is connected to the element 16 by means of a sleeve 18 which is secured in place by a nut 19. A diaphragm 20, such as that described in detail in my copending application Serial No. 79,736, filed May 14, 1936, is fixed to the sleeve 18 at 21 and carries fixed to the side remote from the sleeve 18 a stud 22. A washer 23 is fast to a circumferential projection 24 fixed to the stud 22, and is adapted to serve as one abutment for a helical spring 25. A primary lever 26 is pivoted to the element 16 at 27 and has an opening 28 therein by means of which the stud 22 extends therethrough. The primary lever 26 is adapted to serve as the other abutment for the helical spring 25. The stud 22 is enlarged at 30 to provide a continuous shoulder 31 to abut projections 29 on the primary lever 26 during its normal pivotal movement, so that the resiliency of the helical spring is actually confined between the enlargement 30 and the washer 23, though it acts against the primary lever 26 during such normal movement. A secondary lever, generally indicated 35, is pivoted to the element 16 at 36, and has an opening 37 through an intermediate insulated portion 38, by means of which it is adapted to freely encircle the enlargement 30. The specific details of this type of lever construction are more particularly described in my copending application Serial No. 80,990, filed May 21, 1936.

In the present disclosure, the secondary lever 35 has a contact-carrying portion 39, which is bimetallic in construction, to compensate for movement of the lever 35 in a gradual rise in winding temperature, and is connected to the portion 38 by screw means 40, which likewise serves to connect one end of a current-carrying wire 41' to the portion 39. The portion 39 carries an armature 42 which includes a relatively non-permeable element 43 and relatively permeable elements 44 and 45. The armature is adapted to pass between the legs 46 of a magnet 47, which is insulatively mounted on the frame element 16 by insulating means 48. A switch backing plate 50 is mounted on the magnet and supports a switch plate 51 having a contact point 52, which is adapted to be engaged by contact means 49 on the switch portion 39. The specific details of this switch assemblage are more particularly described in my copending application Serial No. 80,090, filed May 16, 1936. A lead 55 is connected to a terminal 56 which, in turn, is connected to the switch backing plate 50 at 57 by means of a connection 58.

The secondary lever 35 is biased towards closed position by means of a light spring 60, which is connected to the lever at the offset portion 61, and to the front plate 15 by means of the bracket 62. The primary lever contacts the secondary lever at 65 to transfer forces or movements applied to the primary lever to the secondary lever. The frame element 16 has brackets 66 integral therewith or fixed thereto, by means of which the relay is mounted within the motor casing.

Referring again to Fig. 1, it will be seen that the tube 17 is flattened at 70 in that portion which is inserted into the field windings or coils 71 of the motor. This construction is used in order to obviate separating unduly the windings of the field coil. The leads 55 and 41 connect the switch in the main motor circuit. By field windings are contemplated, of course, the starting and running windings. The tube may be inserted into any stationary windings.

There is shown in Fig. 4 a modification of the snap-action for the secondary lever. In this disclosure, a helical spring 75 replaces the magnet and related parts. The portion 39' of the secondary lever 35' has a flange portion 80, which is adapted to receive one point 76 of the spring 75 in an indentation 81. The other end 77 of the spring is supported by means of a screw 78, which is adjustably mounted through an offset portion 82 of the frame element 16'. In other respects, the switch is the same as that described above. It should be appreciated that, in either modification of snap-action, the spring 60 may be omitted so that manual resetting of the device would be necessary after a break. In some installations, this is highly desirable, and it is to be understood that such omission of the spring 60 is fully contemplated by the present invention.

*Operation*

Heat generated from any cause in the field coils 71 affects the thermally sensitive fluid in the flattened portion 70 of the tube 17, which thereby expands and parts the diaphragm members, which moves the stud 22, washer 23, and spring 25 to the right (Fig. 2). The spring acts against the primary lever 26 to move it clockwise about its pivot 27, which, in turn, transfers the force applied to it to the secondary lever at 65, thereby pivoting the secondary lever counterclockwise about the point 36 on a fulcrum to break the contact between the points 52 and 49. Where the portion 39 of the secondary lever 35 is of compensating bimetallic construction, a gradual rise in the temperature within the motor will affect this portion as well as the fluid in the tube 17, as the switch assemblage is mounted close to the motor windings to receive radiated heat. As noted, the bimetallic portion 39 is constructed to compensate for pivotal movement of the secondary lever about its pivot point resultant of gradual temperature rise in the windings, so that contact between the points 52 and 49 will not be broken until a predetermined temperature within the motor windings is reached. However, should the heat within the field coils be of a sudden nature, as where the motor is blocked, then there will not be sufficient time for the heat to pass to and affect the compensating bimetallic portion 39 and, therefore, the sudden expanding of the fluid within the tube, which is acted upon substantially immediately by the temperature rising within the field coil, will move the switch parts to break the contact between the points 52 and 49 at a predetermined temperature much lower than that set for breaking of the contact upon a gradual rise in temperature. This is true because the heat in the windings will not pass nearly so quickly to the bimetal by radiation as it does to the fluid by conduction. Thus, a switch assemblage set to break contact at 210° F. upon a gradual rise in temperature, will break contact at 130° upon a sudden rise in temperature.

The switch assemblage may be used in combination with all types of motors, the primary requisite being to position the fluid-containing tube within the selected current-receiving coils and the switch itself within the motor casing. It is to be understood that the fluid-carrying tube can be placed within the starting or running windings of a motor.

Under certain conditions of operation, it may be desirable to provide a secondary lever 35 of a conventional type, omitting the bimetallic construction, in which case, the switch will be opened solely by the expansion of the fluid within the tube 17, and, of course, at one predetermined winding's temperature.

There is disclosed two modifications of snap-action for the breaking and making of contact between the points 52 and 49. In Figs. 2 and 3, a magnet and an armature are employed to snap the switch open and closed; whereas, in Fig. 4, a helical spring is used. Other types of construction are contemplated to effect this make and break relation. Further, in some installations, it will be highly desirable to obviate "repeating" of the make and break relation of the points 52 and 49, in which case, the spring 60 is omitted from the construction. With the spring 60 absent, the secondary lever 35 will remain in open position after a break of the contacts due to rise in temperature, until it is manually reset.

It is thus apparent that there has been provided the combination of a motor with a switch assemblage which is adapted to effect and achieve all of the advantages ascribed thereto. The term "switch assemblage" used herein is intended to include the electrical and thermally affected elements as a group, whereas "switch" is intended to include only the electrical and related elements.

What is claimed is:

1. In combination, a motor including field windings, a switch including a movable member having thermally sensitive means, said switch being mounted relative to the motor with the thermally sensitive portion in direct heat exchange relation with the said windings, and other thermally sensitive means contiguous to the windings, and means mechanically connecting said other thermally sensitive means to the switch to move said movable member.

2. In combination, a motor including field windings, a switch including a movable member having a thermally sensitive portion, said switch being disposed relative to the motor with its thermally sensitive portion in direct heat exchange relation with said windings, a second thermally sensitive means including a portion contiguous to the windings, and means to effect movement of the movable member comprising a mechanical connection between said second thermally sensitive means and the switch.

3. In combination, a motor including field windings and a casing, a switch mounted within the casing, said switch including thermally sensitive means, other thermally sensitive means contiguous to the windings and connected to the switch, said means being so related that the switch is actuated to break contact at one temperature of the windings upon sudden rise in heat therein and at another temperature of the windings upon gradual rise of heat therein.

4. In combination, a motor including field windings and a casing, a switch mounted within the casing and including a movable member having a bimetallic portion, and a tube carrying a thermally sensitive fluid, said tube having a portion between the windings and being connected to the switch, said thermally sensitive elements being so related that gradual rise of heat in the windings effects a breaking actuation of the switch at one temperature, whereas sudden rise of heat in the windings effects a breaking actuation of the switch at another temperature.

5. In combination, a motor including field windings and a casing, a switch mounted in the casing, a movable member in the switch including a bimetallic portion and a contact, a second contact cooperating therewith, said portion being adapted to bias the contacts towards closed position in a gradual rise in temperature in the windings through a predetermined temperature range, a tube carrying a thermally sensitive fluid, said tube having a portion embedded within the windings and being operatively connected to the switch, so that expansion of the fluid due to heat rise in the windings effects movement of the movable member to open the contacts at one temperature of the windings on sudden heat rise therein and to open the contacts at a relatively higher temperature of the windings on gradual heat rise therein.

6. In combination, a motor including field windings and a casing, a switch mounted within the casing, thermally sensitive means including a portion contiguous to the windings, said means being mechanically connected to the switch to actuate a movable member in the switch carrying a contact adapted to cooperate with a second contact, said member including a thermally sensitive portion, means including said last mentioned thermally sensitive portion to compensate for movement of the movable member effected by the thermally sensitive means when actuated by gradual heat rise in the windings to maintain the contacts closed through a predetermined winding's temperature range, but to allow the contacts to open at heat rise beyond said range.

7. In combination, a motor including field windings and a casing, a switch mounted within the casing, a tube enclosing a thermally sensitive fluid having a portion embedded within the windings and being operatively connected to the switch, a movable contact carrying member in the switch, a second contact adapted to cooperate with the first contact, said member including a bimetallic portion adapted to bias the member towards closed position of the contacts upon rise in temperature within the casing throughout a predetermined temperature range, said fluid and bimetallic portion being so related that sudden expansion of the fluid effects opening of the contacts at one temperature of the windings, whereas gradual expansion of the fluid effects opening of the contacts at another temperature of the windings.

LAWRENCE M. PERSONS.
JAMES A. RODGERS.